United States Patent
Lerosey

(10) Patent No.: US 12,124,910 B2
(45) Date of Patent: Oct. 22, 2024

(54) METHOD AND SYSTEM FOR DETECTING RECEIVERS, AND ADJUSTABLE RECEIVER

(71) Applicants: GREENERWAVE, Valbonne (FR); CENTRE NATIONAL DE LA RECHERCHE SCIENTIFIQUE—CNRS, Paris (FR); ECOLE SUPÉRIEURE DE PHYSIQUE ET DE CHIMIE INDUSTRIELLES DE LA VILLE DE PARIS, Paris (FR)

(72) Inventor: Geoffroy Lerosey, Paris (FR)

(73) Assignees: GREENERWAVE, Valbonne (FR); CENTRE NATIONAL DE LA RECHERCHE SCIENTIFIQUE, Paris (FR); ECOLE SUPÉRIEURE DE PHYSIQUE ET DE CHIMIE INDUSTRIELLES DE LA VILLE DE PARIS, Paris (FR)

( * ) Notice: Subject to any disclaimer, the term of this patent is extended or adjusted under 35 U.S.C. 154(b) by 70 days.

(21) Appl. No.: 17/920,761

(22) PCT Filed: Apr. 15, 2021

(86) PCT No.: PCT/FR2021/050665
§ 371 (c)(1),
(2) Date: Oct. 21, 2022

(87) PCT Pub. No.: WO2021/214403
PCT Pub. Date: Oct. 28, 2021

(65) Prior Publication Data
US 2023/0161980 A1    May 25, 2023

(30) Foreign Application Priority Data
Apr. 24, 2020    (FR) .................... 2004125

(51) Int. Cl.
*G06K 7/10*    (2006.01)
*H04B 1/16*    (2006.01)

(52) U.S. Cl.
CPC ............ *G06K 7/10316* (2013.01); *H04B 1/16* (2013.01)

(58) Field of Classification Search
CPC .................................. G06K 7/10316
(Continued)

(56) References Cited

U.S. PATENT DOCUMENTS

| 6,538,621 B1 | 3/2003 | Sievenpiper et al. |
| 2004/0263408 A1 | 12/2004 | Seivenpiper et al. |

(Continued)

FOREIGN PATENT DOCUMENTS

| EP | 2 314 961 | 4/2011 |
| FR | 3 010 836 | 3/2015 |

(Continued)

OTHER PUBLICATIONS

Michael Taynann Barros, et al., "Integrated Terahertz Communication With Reflectors for 5G Small-Cell Networks" IEEE Transactions on Vehicular Technology, IEEE Service Center, vol. 66. No. 7, Jul. 1, 2017, pp. 5647-5657 (11 pages).

(Continued)

*Primary Examiner* — Rafferty D Kelly
(74) *Attorney, Agent, or Firm* — NIXON & VANDERHYE

(57) ABSTRACT

A method for detecting receivers includes a step of detecting a receiver, in which step a general controller detects an adjustable receiver when a general antenna receives a secondary wave emitted by the adjustable receiver, followed by a reconfiguration step in which the general controller commands a controller of the detected adjustable receiver to switch to an interaction mode in which the impedance of the adjustable receiver is alternated between a first configuration impedance and a second configuration impedance in order to detect other receivers. The reconfiguration step is of a (Continued)

duration that is an order of magnitude higher than the duration of each alternation of the first and second configuration impedances.

22 Claims, 3 Drawing Sheets

(58) Field of Classification Search
USPC .......................................................... 235/451
See application file for complete search history.

(56) References Cited

U.S. PATENT DOCUMENTS

| 2005/0104790 | A1 | 5/2005 | Duron |
| 2005/0190098 | A1* | 9/2005 | Bridgelall ............. G01S 13/878 342/146 |
| 2012/0176227 | A1 | 7/2012 | Nikitin |
| 2013/0265140 | A1 | 10/2013 | Gudan et al. |
| 2018/0129834 | A1 | 5/2018 | Nikitin et al. |

FOREIGN PATENT DOCUMENTS

| GB | 2552918 | 2/2018 |
| WO | 2008/007024 | 1/2008 |
| WO | 2015/039769 | 3/2015 |

OTHER PUBLICATIONS

Ramon F. Brena, et al., "Evolution of Indoor Positioning Technologies: A Survey", Journal of Sensors, vol. 2017 (6, article 359), published Mar. 29, 2017, 22 pages.
Philipp del Hougne, et al., "Dynamic Metasurface Aperture as Smart Around-the-Corner Motion Detector", Scientific Reports, vol. 8, No. 1, Dec. 2018, 10 pages.
Hirokazu Sawada, et al., "Disconnection Probability Improvement by Using Artificial Multi Reflectors for Millimeter-Wave Indoor Wireless Communications" IEEE Transactions on Antennas and Propagation, IEEE Service Center, vol. 61, No. 4, Apr. 1, 2013, pp. 1868-1875 (8 pages).
Search Report for FR Application No. 1902033 dated Oct. 29, 2019, 2 pages.
Search Report for FR Application No. 2004125 dated Dec. 14, 2020, 2 pages.
International Search Report for PCT/FR2019/051211 dated Nov. 12, 2019, 3 pages.
International Search Report for PCT/FR2020/050250 dated May 29, 2020, 2 pages.
International Search Report for PCT/FR2021/050665 dated Jul. 13, 2021, 5 pages.
Written Opinion of the ISA for PCT/FR2021/050665 dated Jul. 13, 2021, 8 pages.

* cited by examiner

METHOD AND SYSTEM FOR DETECTING RECEIVERS, AND ADJUSTABLE RECEIVER

CROSS-REFERENCE TO RELATED APPLICATIONS

This application is the U.S. national phase of International Application No. PCT/FR2021/050665 filed Apr. 15, 2021 which designated the U.S. and claims priority to FR Patent Application No. 2004125 filed Apr. 24, 2020, the entire contents of each of which are hereby incorporated by reference.

TECHNICAL FIELD

This invention relates to a receiver detection method and to a system which enables implementing the method, as well as to an adjustable receiver.

STATE OF THE PRIOR ART

Items available for purchase may be provided with labels or badges equipped with RFID technology, for example in order to reduce checkout time. The items are placed in a tray in front or to the side of the cash register, and the system identifies the items by means of the RFID tags and issues the receipt automatically, without the cashier needing to scan each item individually. Time is therefore saved.

However, some items may not be detected by the system, which can lead to checkout errors.

When multiple receivers (or badges) are placed next to each other, as in the case of a cash register tray, they may be difficult to read, in particular because of interference and/or electromagnetic field minimas. These interferences are due both to the environment, which can scatter, reflect, and/or diffract the waves, but also to the receivers themselves, which, because they are also scatterers, can reflect, scatter, diffract, even attenuate the waves.

There may also be problems with detection of the receivers when they send simultaneous responses.

STATEMENT OF DISCLOSURE

This disclosure is intended to improve badge detection within a volume.

To this end, a method is provided for detecting receivers, implemented by a detection system comprising a general antenna suitable for emitting a primary wave, and a general controller connected to the general antenna, the system comprising an adjustable receiver having a receiver antenna suitable for receiving the primary wave and for emitting a secondary wave, the adjustable receiver having a receiver controller connected to the receiver antenna, the receiver controller being suitable for detecting the primary wave received by the receiver antenna and for commanding the emission of the secondary wave by the receiver antenna, the adjustable receiver having a modifiable impedance thus influencing the secondary wave emitted, the adjustable receiver initially being in a detection mode where the adjustable receiver has a base impedance, the method comprising:
- a receiver detection step in which the adjustable receiver is detected by the general controller when the general antenna receives the secondary wave emitted by the adjustable receiver, followed by
- a reconfiguration step in which the general controller commands the receiver controller to switch to an interaction mode where the impedance of the adjustable receiver is alternated between a first configuration impedance and a second configuration impedance in order to detect other receivers, the reconfiguration step being of a duration that is an order of magnitude higher than the duration of each alternation of the first and second configuration impedances.

By means of the above arrangements, the number of adjustable receivers made available to the general controller for the detection of new receivers increases as they are detected. Each time a receiver is detected, its impedance is adjusted by the general controller to a mode suitable for the detection of other receivers. The system is then able to more effectively detect the presence of one or more receivers not yet detected, regardless of the position of said receivers and whether they are fixed or mobile.

In various embodiments of the system, use may be made of one or more of the following arrangements:
- the base impedance is imposed by the receiver controller independently of the general controller.
- the first configuration impedance is the base impedance.
- the first configuration impedance is at a distance from the second configuration impedance.
- the first configuration impedance and the second configuration impedance are close to and with one on either side of the base impedance within the complex plane.
- the adjustable receiver is a first adjustable receiver, the receiver antenna is a first receiver antenna, the primary wave is a first primary wave, the secondary wave is a first secondary wave, the receiver controller is a first receiver controller, the base impedance is a first base impedance, the configuration impedance is a first configuration impedance, and the system contains a second adjustable receiver, the second adjustable receiver having a second receiver antenna suitable for receiving the primary wave and emitting a second secondary wave and a second receiver controller connected to the second receiver antenna, the second receiver controller being suitable for controlling the emission of the second secondary wave by the second receiver antenna and for detecting the primary wave received by the second receiver antenna, the second adjustable receiver having a modifiable impedance thus influencing the second secondary wave emitted by the second receiver antenna, the second adjustable receiver initially being in detection mode where the second adjustable receiver has a second base impedance,
  the method further comprising a reconfiguration step of reconfiguring the second receiver in which, when the general antenna receives the second secondary wave emitted by the second adjustable receiver and the controller detects the second adjustable receiver, the general controller commands the second adjustable receiver to switch to interaction mode where the impedance of the second adjustable receiver alternates between a first configuration impedance of the second receiver and a second configuration impedance of the second receiver in order to detect other receivers, the reconfiguration step of reconfiguring the second adjustable receiver being of a duration that is an order of magnitude higher than the duration of each alternation of the first and second configuration impedances of the second receiver.
- the first configuration impedance of the second receiver is the second base impedance of the second receiver.

the first configuration impedance of the second receiver is
at a distance from the second configuration impedance
of the second receiver.

the first configuration impedance of the second receiver
and the second configuration impedance of the second
receiver are close to and with one on either side of the
base impedance within the complex plane.

the alternations of the configuration impedances of the
second receiver in interaction mode are determined by
an optimization algorithm, or by a predefined series of
impedance values.

the alternations of the configuration impedances of the
second receiver in interaction mode are carried out at
irregular non-periodic time instants.

the general controller determines the alternations of the
configuration impedances of the second receiver in
interaction mode.

the general controller commands the switch to interaction
mode of the identified receivers, and the controllers of
these identified adjustable receivers determine the alternations of the configuration impedances when they are
in interaction mode.

in interaction mode, the impedance of the adjustable
receiver alternates between a plurality of configuration
impedances.

the adjustable receiver includes a plurality of adjustable
components and associated antennas, and: the general
controller commands the emission by the general
antenna of a general control wave containing identification information along with an associated adjustment
parameter to designate each adjustable component for
which said adjustment parameter is intended, and said
adjustable component controls the impedance of the
associated antenna in relation to the adjustment parameter if the identification information is equal to its
adjustable component identifier.

the system further comprises an adjustable element connected to the general antenna, and in the receiver
detection step the general controller also modifies the
impedance of the adjustable element.

the general controller simultaneously modifies the impedance of the adjustable element and the impedance of the
identified adjustable receiver, according to values
determined by an optimization algorithm.

Also provided is a receiver detection system, comprising:
an adjustable receiver,
a general antenna suitable for emitting a primary wave,
and for receiving a secondary wave emitted by the
adjustable receiver in response to reception of the
primary wave,
a general controller connected to the general antenna, the
general controller being suitable for commanding the
emission of the primary wave and for detecting the
adjustable receiver by means of the secondary wave
received by the general antenna,
characterized in that the adjustable receiver further comprises:
a receiver antenna suitable for emitting the secondary
wave;
a receiver controller connected to the receiver antenna, the
receiver controller being suitable for commanding the
emission of the secondary wave by the receiver antenna
and for detecting the primary wave received by the
receiver antenna, the adjustable receiver having a modifiable impedance in
order to modify the manner in which the primary wave
is reflected and/or transmitted by the receiver antenna
as a secondary wave,
the system being configured such that, when the adjustable receiver is detected by the general controller, the
general controller commands the receiver controller to
switch from a detection mode to an interaction mode,
in detection mode, the adjustable receiver has a base
impedance,
in interaction mode, the impedance of the adjustable
receiver is alternated between a first configuration
impedance and a second configuration impedance in
order to detect other receivers, the interaction mode
being of a duration that is an order of magnitude higher
than the duration of each alternation of the first and
second configuration impedances.

In various embodiments of the system, use may be made
of one or more of the following arrangements:

the first configuration impedance is the base impedance.
the first configuration impedance is at a distance from the
second configuration impedance.
the alternations of the configuration impedances in interaction mode are determined by an optimization algorithm or by a predefined series of impedance values.
the alternations of the configuration impedances in interaction mode are carried out at irregular non-periodic
time instants.
the general controller is suitable for commanding the
alternations of the configuration impedances in interaction mode of the adjustable receiver.
the general controller is suitable for commanding the
switch to interaction mode of the identified adjustable
receivers, and the controller of the identified adjustable
receiver is suitable for commanding the alternations of
the configuration impedance when it is in interaction
mode.

Also provided is an adjustable receiver comprising:
an antenna suitable for emitting a secondary wave in
response to receiving a primary wave and for receiving
a general control wave; and
a controller connected to the antenna, the controller being
suitable for commanding the emission of the secondary
wave and for detecting the primary wave received and
the general control wave,
the adjustable receiver having a modifiable impedance
thus influencing the secondary wave emitted,
the adjustable receiver having a detection mode and an
interaction mode, the adjustable receiver switching
from detection mode to interaction mode according to
the general control wave received,
in detection mode, the adjustable receiver has a base
impedance, and
in interaction mode, the impedance of the adjustable
receiver is adapted to alternate between a first configuration impedance and a second configuration impedance in order to detect other receivers, the interaction
mode being of a duration that is an order of magnitude
higher than the duration of each alternation of the first
and second configuration impedances.

BRIEF DESCRIPTION OF DRAWINGS

Other features and advantages of this disclosure will
become apparent from the following description of one of its
embodiments, given by way of non-limiting example, with
reference to the appended drawings.

In the drawings.

In the various figures, the same reference numerals designate identical or similar elements.

DETAILED DESCRIPTION

System

Figure 1:
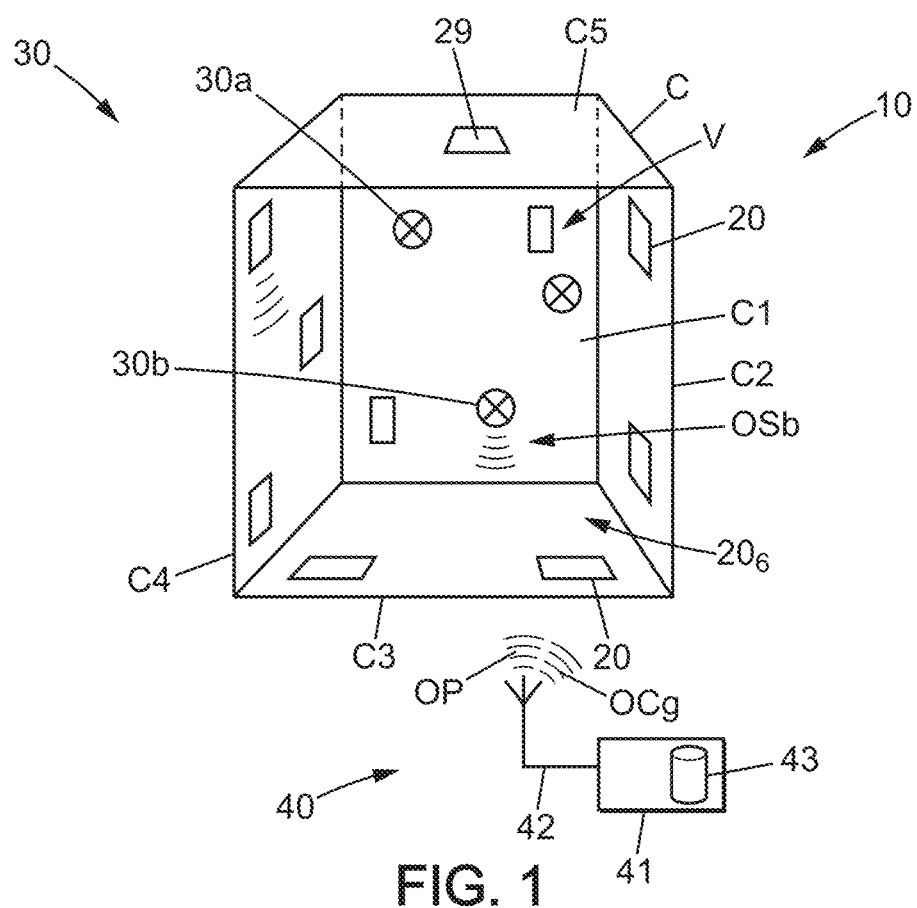
FIG. 1 is a general diagram of one embodiment of a receiver detection system.

FIG. 1 is a schematic perspective view of one embodiment of a receiver detection system 10. In this example, the system 10 comprises a container C having a volume V. The container C may be optional, and the volume V defined without physical walls. The container C is suitable for containing within its volume V one, two, or a plurality of receivers. Among these receivers, one or more may be adjustable receivers 30 which, once detected, can be controlled to participate in the detection of other receivers possibly contained within the volume V. The adjustable receivers may comprise in particular a first adjustable receiver 30a and a second adjustable receiver 30b. The adjustable receivers 30 may be static or mobile. An identification or a simple communication in itself also corresponds to a detection. The system 10 is thus a system for receiver detection and/or receiver identification and/or communication with a receiver. According to one example, the adjustable receiver(s) 30 is attached to merchandise (e.g. items for sale), and the container C is a tray of a store checkout register. Thus, simply by placing the items in the tray, the register can identify the items without scanning them one by one. Other applications are described in this disclosure.

As will be described below, the adjustable receivers identified contribute, as they are identified, to the identification of other receivers present within the volume V. Although only two adjustable receivers 30a, 30b are illustrated in the figures, the system 10 could have three or more receivers similar to adjustable receivers 30a, 30b. It could be that some of the receivers, among those identified, are not receivers whose impedance is adjustable.

In the particular case of FIG. 1, the container C is a parallelepiped comprising a bottom face $C_1$, four side faces $C_2$, $C_3$, $C_4$, $C_5$, and an open face $C_6$ in opposition to the bottom face $C_1$. Adjustable receivers 30 such as the first adjustable receiver 30a and the second adjustable receiver 30b can be inserted into and/or removed from the volume through the opening face $C_6$. These adjustable receivers 30 may also be moved about within the volume V. The first adjustable receiver 30a and the second adjustable receiver 30b are generally identical and will be described in detail below with reference to a generic receiver 30.

The system 10 further comprises:
- a general antenna 42 suitable for emitting a primary wave OP into the volume V, and suitable for receiving a secondary wave OS respectively emitted by each adjustable receiver 30 positioned in the volume V in response to the reception by this receiver of the primary wave OP, and
- a general controller 41 connected to the general antenna 42, the general controller 41 being suitable for commanding the emission of the primary wave OP and for identifying the adjustable receiver(s) 30 by the corresponding secondary wave OS emitted by the adjustable receiver(s) 30 and received by the general antenna 42. The general controller 41 and the general antenna 42 are shown in the figures according to one embodiment as being arranged outside the volume V. Alternatively, the general controller 41 and the general antenna 42 could one or both be arranged inside the volume V.

Adjustable Receiver

Figure 2:
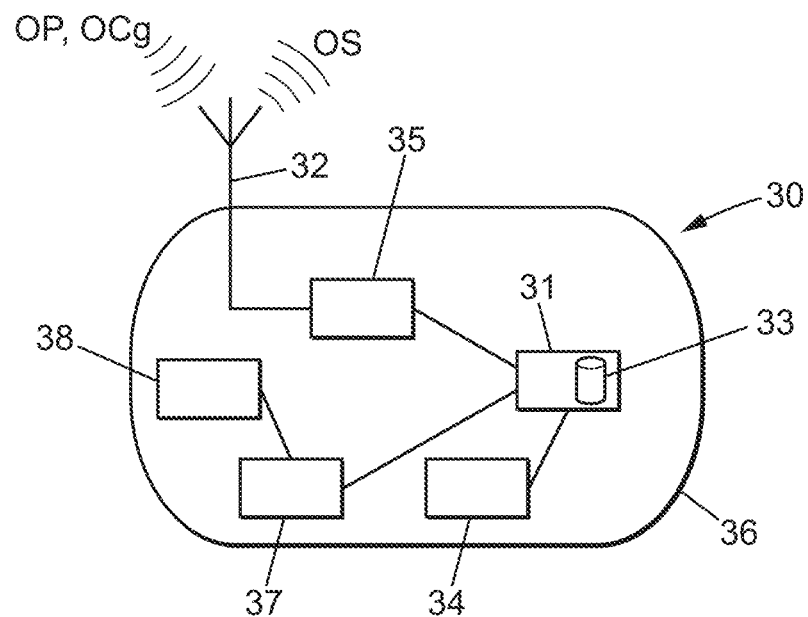
FIG. 2 illustrates an example of an adjustable receiver for the system of FIG. 1.

One of the adjustable receivers 30 is schematically illustrated in FIG. 2. The first adjustable receiver 30a and the second adjustable receiver 30b being similar to the generic adjustable receiver 30, the description of the structure and the mode of operation of the adjustable receiver 30 will serve as a description for the first adjustable receiver 30a and the second adjustable receiver 30b, bearing in mind that the common elements will be denoted with the index "a" for the first adjustable receiver 30a and with the index "b" for the second adjustable receiver 30b.

The adjustable receiver 30 comprises an antenna 32 suitable for emitting the secondary wave OS in response to reception of the primary wave OP emitted by the general antenna 42. The adjustable receiver 30 also comprises a controller 31 connected to the antenna 32 and an adjustable component 35 connected to the controller 31 on the one hand and to the antenna 32 on the other hand. The controller 31 is configured to command the emission of the secondary wave OS, and to detect the primary wave OP received and to decode the information contained therein. The controller 31 also controls the impedance of the adjustable component 35, which influences the secondary wave OS emitted by the antenna 32. The adjustable component 35 may be connected to the controller 31 in a wired or wireless manner. A local control wave OC1 may be sent from the controller 31 to the adjustable component 35 in order to transmit the adjustment parameters to the adjustable component 35.

Each adjustable component 35 has an associated antenna. This antenna may be the antenna 32 of the adjustable receiver 30 or a separate antenna.

According to one embodiment, at least one of the adjustable receivers 30 comprises a plurality of adjustable components 35. The adjustable receiver 30 could comprise several adjustable components 35, each component having an associated antenna. In another embodiment, the adjustable receiver 30 comprises a single antenna for the plurality of adjustable components 35 of this receiver. The adjustable receiver 30 may comprise one or more controllers 31 for controlling the whole. For simplicity, as an example this description will describe adjustable receivers each having one antenna, one controller, and one adjustable component, it being understood that there could be several antennas and/or several adjustable components and/or several controllers per adjustable receiver.

General Structure

The adjustable receiver 30 is for example a device of the technology known as RFID for "radio frequency identification".

The adjustable receiver 30 is for example a connected object, for example of the Internet of Things (IoT) type or of the type with transmission via WiFi or Bluetooth or via a LoRa network.

The adjustable receiver 30 could comprise one or more sensors (e.g. temperature, humidity, presence detection, gas detection, flow rate, voltage, current). One or more of the values measured by a sensor would be stored in a receiver memory or any other memory and could be transmitted to the general controller 41 by means of the secondary wave OS.

The controller 31, the antenna 32, and the adjustable component 35 of a same receiver 30 may be grouped together on a base 36 so that the receiver 30 forms a compact object. According to one embodiment, the base 36 is for example a label for clothes or supplies that is thin, e.g. less than 0.2 mm in thickness, for example made of a flexible polymer material. The adjustable component 35, the antenna 32, and the controller 31 may for example be fixed on the base 36 by adhesion. The adjustable component 35, the antenna 32, and the controller 31 of the adjustable receiver 30 are themselves circuits that are thin, such that the adjustable receiver 30 is a thin and flexible device which is associated with an item.

Adjustable Components

There are several ways to obtain an adjustable receiver 30 of variable impedance.

The adjustable component 35 of the adjustable receiver 30 is composed for example of at least one adjustable electronic circuit connected to the antenna 32 in order to modify the impedance of the electromagnetic radiation, which characterizes its interaction with the electromagnetic field and in particular the waves around the receiver. The adjustable electronic circuit(s) is for example a capacitor, a diode, a transistor, or a combination thereof. This adjustable electronic circuit comprises an input that is controllable by the controller 31 so as to modify one of its electronic characteristics, meaning more generally its electrical impedance which is the load impedance of the antenna 32 of the adjustable receiver 30. This modification involves modifying the radiation impedance of the antenna 32 and the interaction with the waves.

The adjustable component 35 is therefore controllable by an input which can be modified for example by a voltage value imposed by the controller 31, and which corresponds for example to one or more adjustment parameter values. These adjustment parameters may be determined by the general controller 41 or alternatively by the controller 31 of the adjustable receiver, as explained in more detail below.

Modifying the impedance of the adjustable receiver 30 modifies the spatial distribution of the primary wave OP within the volume V. This modification may be optimized so as to detect other receivers contained in the volume V and initially not identified by the general controller 41. In addition, as the detection of receivers in the volume V progresses, these receivers become controlled by the general controller 41 so as to participate in modifying the spatial distribution of the primary wave OP in order to detect more effectively any other receivers present in the volume V. Modifying the impedance of the adjustable receiver 30 is much more complex than spatial directivity or focusing: it involves modifying the electromagnetic field within the volume around the receiver.

Modes

When the impedance of the adjustable receiver 30 is modified, the manner in which the primary wave OP is reflected and/or transmitted by the adjustable receiver 30 is modified as well, which influences the overall electromagnetic field within the volume V. This modification is used here to detect other receivers invisible to the general controller 41. Thus, the general controller 41 can command the adjustable receiver 30 to switch to an interaction mode in which the adjustable receiver 30 has changing impedance in order to modify the general electromagnetic field within the volume V. This modification of the electromagnetic field can help detect one or more other receivers previously silent to the general controller 41.

Each adjustable receiver 30 contained in the volume V is initially undetected by the general controller 41 and is in detection mode. In detection mode, the adjustable receiver 30 has a base impedance IB1. The base impedance IB1 is for example a load impedance of the antenna 32 of the adjustable receiver 30, meaning an impedance adapted for receiving maximum energy. For example, the base impedance IB1 of an adjustable receiver 30 is 11+143*j (j is the complex for which j^2=−1). According to one embodiment, the base impedance IB1 of an adjustable receiver 30 is imposed by its controller 31 independently of the general controller 41. According to another embodiment, the base impedance IB1 of an adjustable receiver 30 is commanded by the general controller 41. In detection mode, the adjustable receiver 30 could have several base impedances, and the controller 31 of the adjustable receiver 30 could alternate between these different base impedances. This alternation could take place without the general controller 41 commanding the controller 31 of the adjustable receiver 30, or alternatively could be under the control of the general controller 41.

When the general antenna 42 receives the secondary wave OSa emitted by a receiver located in the volume V and the receiver is an adjustable receiver 30, the general controller 41 can command the controller 31 of this adjustable receiver 30 to switch into interaction mode, in order to help identify other receivers contained within the volume.

In interaction mode, the impedance of the adjustable receiver 30 is alternated between a first configuration impedance IC1 and a second configuration impedance IC2. For example, the first configuration impedance IC1 is IB1−20j, and the second configuration impedance IC2 is IB1+20j. The first configuration impedance IC1 could be infinite and the second configuration impedance IC2 could be zero or of low modulus or close to zero. It is possible for the impedance of the adjustable element 35 to be alternated between three or more configuration impedances. At least one among the first and second configuration impedances IC1, IC2 could be the base impedance IB in order to be able to recover energy.

According to one embodiment, the first configuration impedance IC1 is at a distance from the second configuration impedance IC2. "At a distance" is understood to mean that there is for example an order of magnitude of at least 10 between them. An impedance is a complex value, so an impedance can be considered to be at a distance from another impedance when for example:

their moduli have values that are at a distance from each other, for example having a magnitude ratio between them of at least 2, and preferably of at least 10 (as mentioned above), or their phases have values that are at a distance from each other, such as values differing by at least pi/4, and preferably by more than pi/2, or the modulus of the difference of the first and second impedance has a high value, for example greater than a threshold value, or for example greater than the modulus of the first impedance and/or greater than the modulus of the second impedance.

Many criteria for the distances between impedances can be defined.

A small variation in the impedance of the adjustable components allows greatly modifying the radiation impedance of the antenna which functions as a resonator: at the base frequency in particular of this resonator, the amplitude and the phase of the impedance seen by electromagnetic waves will vary greatly via this small change in load impedance. Thus, as the antenna is dispersive, a small modification to its load impedance around its resonant frequency makes it possible to obtain a distanced type of alternation between a first configuration impedance ICI and a second configuration impedance IC2. In addition, this type of resonator is fairly easy to implement in an adjustable receiver 30 that is small in size and in particular is thin.

According to another embodiment, the first configuration impedance ICI and the second configuration impedance IC2 are close to the base impedance IB. "Close" is understood to mean that there is an order of magnitude of at most 10 between them. An impedance is a complex value, thus an impedance is close to another impedance when their moduli and/or their phases and/or the modulus of their complex difference are close to each other. An advantage of having the first configuration impedance IC1 and the second configuration impedance IC2 be close to the base impedance IB is that the adjustable receiver 30 is able to recover energy and remains powered during interaction mode. According to one embodiment, the first configuration impedance IC1 and the second configuration impedance IC2 are close to and with one on either side of the base impedance within the complex plane.

The first configuration impedance ICI and the second configuration impedance IC2 could both be higher than the base impedance IB1, or both be lower than the base impedance IB1, or one could be higher and one lower than the base impedance IB1.

Figure 3:
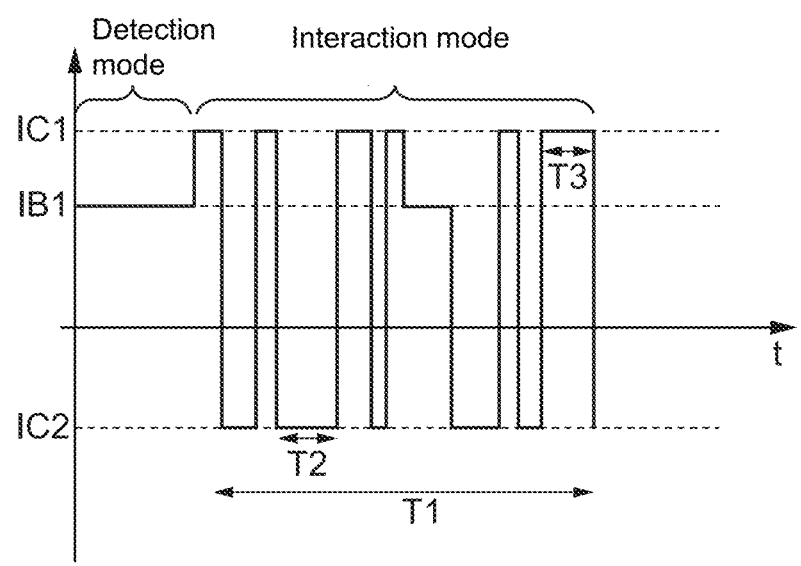
FIG. 3 illustrates an alternation over time of the impedance for an adjustable receiver of FIG. 2.

In interaction mode, there is therefore a fairly frequent alternation between the two or more configuration impedances, in the sense that the duration T1 of interaction mode is of an order of magnitude higher than the duration T2, T3 of each alternation of the first and second configuration impedances ICI and IC2. FIG. 3 for example illustrates this point. According to one example, the duration T1 of interaction mode is 100 ms, and the duration T2, T3 of each alternation of the first and second configuration impedances ICI and IC2 is 10 ms.

Exiting Interaction Mode

Each adjustable receiver detected and switched into interaction mode by the general controller 41 may remain in interaction mode until all receivers present in the volume V are detected.

The adjustable receiver(s) 30 may exit interaction mode after a predetermined period of time which could correspond to the time deemed sufficient for detecting all receivers present in the volume V, for example a few tens or a few hundreds of milliseconds. This period of time could be imposed by the general controller 41 or else could be imposed by the controller 31 of the adjustable receiver 30. It is possible for this time to be different for each or for some of the receivers contained in the volume V. This time could be random.

According to another embodiment, the general controller 41 controls the exiting of the adjustable receivers from interaction mode. The general controller 41 may command all the detected adjustable receivers to exit simultaneously, or may do so by group of receivers.

According to another embodiment, the adjustable receiver 30 remains in interaction mode until the energy stored in this adjustable receiver is below a minimum value.

Alternation Based on Predefined or Random Sequences

According to one embodiment, the general controller 41 periodically defines adjustment parameters for the adjustable components 35 of the receivers 30 that it has detected, randomly or in a predefined manner, in order to sweep through a set of combinations of adjustment parameters, which allows sweeping the volume V of the container with various electromagnetic fields. With each impedance alternation, at the same time the general controller 41 emits a primary wave OP in order to detect receivers with this new setting. Alternatively, the general controller 41 could emit the primary wave OP temporally after sending the impedance adjustment parameters. According to a variant of this embodiment, the general controller 41 only commands the switch of the identified receivers from detection mode to interaction mode, and the controller of each identified adjustable receiver 30 periodically defines adjustment parameters for its adjustable components 35 in a random manner in order to sweep through a set of combinations of the adjustment parameters.

According to another embodiment, the timing of the alternations is not periodic but irregular, dictated, or random.

According to another embodiment, once an adjustable receiver 30 is detected and is in interaction mode, its controller 31 is passive and the general controller 41 commands the impedance alternations of the adjustable receivers 30 via the controller 31 of the adjustable receiver.

According to one embodiment, the general controller 41 commands only the switch of the identified receiver(s) to interaction mode, and the controller(s) 31 of this or these receivers command the impedance alternations of the adjustable receivers 30. These alternations may be preprogrammed. To this end, each controller 31 of the adjustable receiver 30 may include a memory 33 which would contain programming of the interaction mode impedance sequences to be alternated (possibly with a time delay associated with the sequence or with each alternation, for example alternating after an alternation duration on the order of a few milliseconds to a few hundred milliseconds) when the adjustable receiver 30 is switched to interaction mode by the general controller 41.

Alternation Based on Optimization

According to another embodiment, the modification of the electromagnetic field by the adjustable receiver(s) 30 which have been switched to interaction mode may be done so as to optimize this electromagnetic field for detecting other receivers. Optimization makes it possible to use several adjustable receivers 30 (the ones detected) to improve the electromagnetic field within the volume V and thus to detect other receivers which could not be detected before. The general controller 41 monitors the secondary waves OS received by the general antenna 42 (when said waves are received) and originating from the various adjustable receivers 30 detected. Via these waves, the general controller 41 can for example determine reception information concerning the reception of the secondary wave OS received by its general antenna 42, this reception information being for example the level of reception and/or the quality of reception.

The general controller 41 can then use the reception information to estimate a value to be optimized (optimization value), this value being one piece of information or a combination of the pieces of reception information.

The general controller 41 executes, for example, an optimization algorithm based on the set of (temporally) previous parameters, previous estimated values, and current estimated value.

The optimization algorithm may be a maximization or a minimization of the estimated value, depending on the magnitude represented by this value. In one or more successive steps, the optimization algorithm makes it possible to obtain an optimal set of parameters for detecting a new adjustable receiver 30. At each step or at predetermined periodicities, the general controller 41 applies the new set of parameters to the adjustable receivers 30 that it has identified and/or determines reception information for performing the next iteration. These iterations may be performed at a very high rate such that the duration of this optimization is very short compared to the number of receivers to be detected and/or identified in the volume.

The optimal set of parameters makes it possible, for example, to improve the level of reception of the secondary wave OS at the general antenna 42. Due to this modification via the optimized state of the adjustable components of the identified receivers, for example such as the first receiver 30, the propagation field of the secondary wave OS towards the general antenna 42 is improved, and the receiver detection and/or identification, for example of a second receiver 30b previously unidentified in the volume V, is improved or even becomes possible.

Thus, according to one embodiment, the general controller 41 determines the set of parameters for adjusting the plurality of adjustable components of the receivers identified by the general controller 41, for example in order to optimize reception of the secondary wave by the general antenna. 42. The optimization concerns the estimated value, which is for example an estimate of the level of reception and/or of the quality of reception of the secondary wave by the general antenna 42.

Dynamic Optimization

The optimization is dynamic, i.e. the number of parameters sent by the general controller 41 to the adjustable receivers 30 in order to adjust the adjustable components 35 increases as new receivers are detected in the volume V. Thus, when a first adjustable receiver 30a is detected, the general controller 41 will command the change of impedance of this adjustable receiver, and will then do the same for each new adjustable receiver detected. Thus, after a few iterations, five adjustable receivers 30 for example will be controlled by the general controller 41 so as to detect a new receiver present within the volume V.

Figure 4:
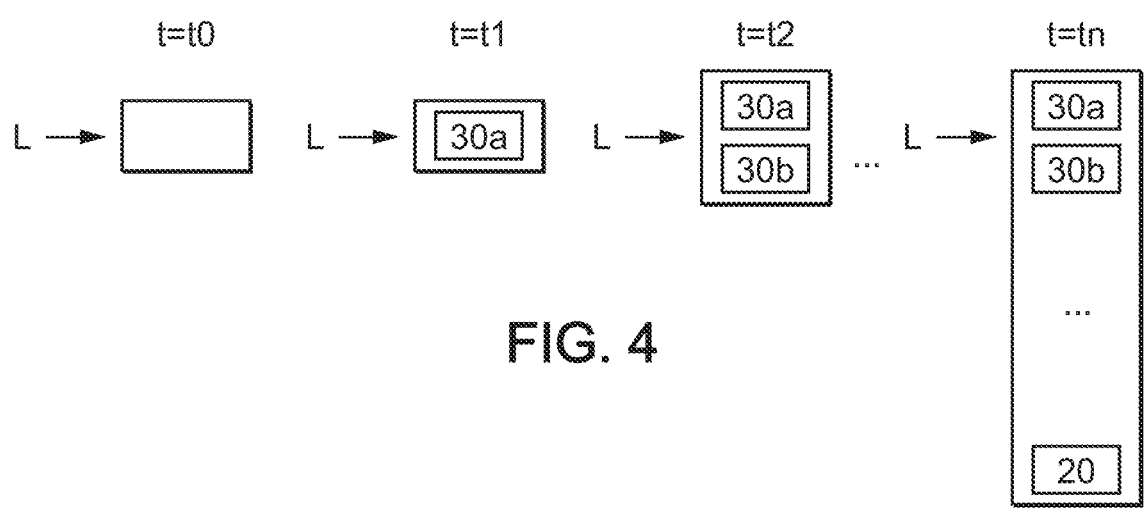
FIG. 4 illustrates a dynamic list used by an algorithm that can be used by the system of FIG. 1.

To illustrate, let us take the example of the first receiver 30a and second receiver 30b present within the volume V, on the assumption that they are initially not identified by the general controller 41. The first 30a and second 30b receivers are initially (t=t0) in detection mode with a respective base impedance IBa, IBb fixed only by their associated controller 31a, 31b (independently of the general controller 41). In a first step, the receiver detection step, the first receiver 30a is detected by the general controller 41 when the general antenna 42 receives the secondary wave OSa emitted by the first receiver 30a (time t=t1). The general controller 41 can then add the first receiver 30a to a dynamic list L of identified receivers (see FIG. 4). The dynamic list L may be saved in a memory of the general controller 41. The list is dynamic because it is updated in real time by adding to it the receivers detected by the general controller 41 as they are detected and switched to interaction mode.

During a third step, the second receiver detection step, the general antenna 42 receives the secondary wave OSb emitted by the second receiver 30b. The general controller 41 identifies the second receiver 30b and can then add the second receiver 30b to its dynamic list L of identified receivers (time t=t2). The general controller 41 further commands the controller 31b of the second receiver 30b to switch to interaction mode in which the impedance of the second adjustable receiver 30b alternates at least between a first configuration impedance IC1b and a second configuration impedance IC2b.

According to one embodiment, the first configuration impedance IC1b of the second receiver 30b is at a distance from the second configuration impedance IC2b of the second receiver 30b. "At a distance" is understood to mean that they have for example an order of magnitude of at least 10 between them. Impedance is a complex value, thus an impedance can be considered to be at a distance from another impedance when for example:

- their moduli have values that are at a distance from each other, for example having a magnitude ratio between them of at least 2, and preferably of at least 10 (as mentioned above), or
- their phases have values that are at a distance from each other, such as values differing by at least pi/4, and preferably more than pi/2, or
- the modulus of the difference of the first and second impedance has a high value, for example greater than a threshold value, or for example greater than the modulus of the first impedance and/or greater than the modulus of the second impedance.

Many criteria for distances between impedances can be defined.

Optimization with Previously Saved Parameters

According to one embodiment, the general controller 41 periodically defines adjustment parameters for the adjustable components of the detected receivers according to a previously saved table in order to sweep through a set of combinations of adjustment parameters.

This previously stored table is for example defined by knowing the propagation of the primary waves OP within the volume V, either by simulation or by measurement in the environment of the volume V. The previously stored table is for example defined in order to ensure the ability to sweep the entire volume V with a predetermined spatial precision.

Next, the general controller 41 proceeds as before: at each adjustment of the adjustable components of the identified receivers, the general controller 41 also controls the emission of a primary wave OP in order to detect receivers with this new setting. This procedure allows it to detect one or more new receivers (adjustable or not) within the volume V. After a predefined number of combinations, this procedure makes it possible to obtain knowledge of all receivers in the volume V.

Alternatively, the general controller 41 periodically carries out a calibration of said previously saved table, for example during a predetermined time (within a time slot and/or on a given day of the week and/or of a month), by searching for the optimum adjustment parameters for some reference adjustable receivers.

This other optimization may be based on the secondary wave OS received by the general controller 41. The general controller 41 determines reception information concerning the reception of the returning secondary wave OS by its antenna (level of reception and/or quality of reception). The general controller 41 then performs an optimization of the set of adjustment parameters for identified adjustable receivers 30.

Following these optimizations of the adjustment parameters for identified adjustable receivers, the general controller 41 deduces the previously saved table by various techniques, such as a parameterization model and/or an interpolation technique.

According to a variant of this embodiment, the general controller 41 only commands the switch of the identified adjustable receivers 30 from detection mode to interaction mode, and the controller 31 of each receiver periodically defines adjustment parameters for the adjustable components according to a previously saved table in the memory of the receiver in question in order to sweep through a set of combinations of adjustment parameters.

Receiver—Identification

In addition, the memory 33 of each receiver 30 may comprise an adjustable receiver identifier IDrr, making it possible to differentiate between receivers (the identifiers are all different).

In this case, the general controller 41 may emit, in a general control wave emission OCg, identification information IID with an impedance adjustment parameter, which makes it possible to designate the identified adjustable receiver of the system 10 for which said adjustment parameter is intended. The general controller 41 thus emits for example the entire set of parameters (all adjustment parameters) sequentially, each adjustment parameter being associated with identification information so that the adjustable receiver 30 to which said adjustment parameter is sent is the only one to apply said adjustment parameter in question.

In the case where the adjustable receiver 30 includes a plurality of adjustable components with their associated antennas, the general control wave contains identification information with an associated adjustment parameter in order to designate each adjustable component for which said adjustment parameter is intended, and the adjustable component controls the impedance of the associated antenna in relation to the adjustment parameter if the identification information is equal to its adjustable component identifier IDcr.

The receiver 30 may thus comprise a receiving device 34 for receiving the general control wave OCg, which decodes an adjustment parameter contained in this general control wave OCg, originating from the general controller 41. The controller 31 of the adjustable receiver 30 then uses the adjustment parameter to control and modify the impedance of the associated adjustable component 35.

The receiving device 34 of the receiver 30 then decodes the identification information IID and the adjustment parameter, in the general control wave OCg. Next, the adjustable receiver 30 controls its impedance (i.e. the adjustable component 35 controls the impedance of its associated antenna) according to the adjustment parameter if the identification information is equal to its adjustable receiver identifier IDrr.

The general controller 41 emits primary waves OP, possibly periodically, within the volume V of the container C in order to detect and identify receivers, and it periodically emits general control waves OCg within the volume V in order to adjust the adjustable receivers 30 which have been detected. Each detected adjustable receiver 30 then selects the adjustment parameter intended for it.

Alternatively, the memory 33 of the adjustable receiver(s) 30 stores a set of adjustment parameters (saved beforehand and/or saved by transmission from the controller) and one (or more) reading period associated with these adjustment parameters. This set of adjustment parameters and reading periods are known to the general controller 41. This arrangement can enable the general controller 41 to avoid systematically sending new adjustment parameters to the adjustable receivers; in other words this reduces the need for transmission. It is possible that this set of adjustment parameters and/or these reading periods are different for each adjustable receiver 30.

According to a first variant of the general controller 41, the general controller 41 comprises, in its memory 43, the dynamic list L of identifiers of the adjustable components or of the adjustable receiver if it has only one adjustable component, this list being filled in with the adjustable receiver identifiers IDrr of the system 10 which are identified in order to be able to transmit the identifier of the adjustable component with the adjustment parameter. Each adjustable receiver 30 emits its adjustable receiver identifier IDrr, possibly periodically, via a return wave which may be the secondary wave Osa. The general controller 41 then establishes the list of adjustable receivers 30 identified in the system 10 and updates it each time a new receiver identifier is received. In addition, an adjustable receiver 30 may be removed from the dynamic list or may be deactivated in said list (by an activity flag) if the general controller 41 no longer receives the identifier of the adjustable receiver 30 after a period of time greater than an inactivation duration limit of an adjustable receiver 30.

Thus, by this dynamic operation, the general controller 41 will always use operative or functional adjustable receivers 30. This dynamic operation also facilitates installation of the system 10, which automatically adapts to the adjustable receivers 30 present within the volume V.

In addition, according to one variant, the adjustable receiver 30 will periodically emit its adjustable identifier IDrr solely in the presence of a primary wave OP and/or of a general control wave OCg originating from the antenna 42 of the controller 41, in particular:
either because this adjustable receiver 30 uses an energy recovery device 37 for recovering energy from this wave for its operation. In the absence of energy, the adjustable receiver 30 will be automatically switched off and will not broadcast its identifier;
or because this adjustable receiver 30 is designed not to transmit its identifier if it has not received a primary wave OP or a general control wave OCg for a period of time greater than a predetermined standby time.

Receiver—Impedance Alternation Command

The impedance alternations in interaction mode of the identified adjustable receivers 30 may be carried out in different ways. According to one embodiment, an optimization algorithm iteratively determines the impedances of each of the adjustable components in the dynamic list L, the aim being to optimize the electromagnetic field in the volume V. Alternatively, the general controller 41 comprises a memory which stores one or more sets of optimal parameters for detecting receivers present in the volume V but which are still unidentified. In this manner, the optimization algorithm can start its process based on one or more of the saved sets of parameters, which allows saving time in the optimization and avoids transient effects.

Alternatively, the optimization algorithm monitors its performance and stops its optimization iterations when a stop criterion is reached. The stop criterion may be the reception by the general controller 41 of an identifier of a receiver not yet identified. It is thus possible to avoid insignificant variations or fluctuations in the reception of the secondary wave OS.

Finally, the above embodiments of the general controller 41 may be combined to produce part of the adjustment parameters by optimization on the secondary wave OS received, part of the adjustment parameters by random adjustment, and part of the adjustment parameters by pre-definition within the volume V. This strategy allows identifying even more receivers within the volume V, and more rapidly.

Furthermore, so that a receiver is able to receive and decode an adjustment parameter intended for it, the general controller 41 determines this adjustment parameter, for example according to the optimization procedure described above for each adjustable receiver 30 included in the system 10 (i.e. the receivers detected and listed by the general controller 41 in the dynamic list L at that moment in time), and the general controller 41 transmits each adjustment parameter to the corresponding associated receiver in the emission of a general control wave OCg, which may or may not be the primary wave OP.

In particular, this transmission in a control wave OC is carried out by any type of encoding and/or any type of modulation in the general control wave OCg emission signal that the general controller 41 supplies to the general antenna 42.

Alternatively, the general controller 41 may command all adjustable receivers 30 at the same time to change their impedance or to adjust their impedance according to a parameter which is specific to each receiver. For example, a command may be sent which depends on the identity of each receiver ("includes or does not include a 0", "has an even last number", etc.), and which modifies the impedance of each reception according to a defined formula.

Receiver—Energy Recovery

Furthermore, with reference to FIG. 2, one (or more) adjustable receiver(s) 30 may further include an energy storage device 38 suitable for storing and possibly accumulating energy received by the energy recovery device 37. In this manner, the adjustable receiver 30 will have more autonomy and is able to operate for a period of time determined by the capacity of said energy storage device. This energy storage device is for example a capacitor, or a battery, or any other energy storage device.

The energy recovery device 37 is for example capable of recovering energy from the primary wave OP and/or from the general control wave OCg in order to power its receiving device 34 and/or its controller 31 and/or the adjustable component(s) 35.

The adjustable receiver 30 can thus be energy self-sufficient and also self-sufficient in adapting its impedance. It is possible that the adjustable component(s) 35 of each adjustable receiver 30 do not need a wired connection with the controller 31 of the adjustable receiver 30, and also have access to their energy recovery device.

Advantageously, all the adjustable receivers of the system 10 may each have (individually) their own energy recovery device 37 and are thus independent of each other.

Adjustable Elements

Optionally, and with reference again to FIG. 1, the system 10 may further comprise one (or more) adjustable element 20 fixed within the volume V. The adjustable elements 20 may have an impedance which can be modified in order to modify the manner in which the primary wave OP is reflected and/or transmitted by each adjustable element 20, in the same manner as discussed above for the adjustable receivers 30.

The adjustable elements 20 are structurally and functionally similar to the adjustable receivers 30, except that they are fixed relative to the volume V, are identified at all times by the general controller 41, and are directly controlled at all times by the general controller 41. Thus, they are passive elements which have their impedance dictated by the general controller 41.

The number N of adjustable elements 20 is preferably greater than or equal to two. Optionally, the number N is greater than five, or ten or twenty, to further modify the distribution of the primary wave OP within the volume V.

According to one embodiment, the general control wave OCg or the primary wave OP emitted by the general controller 41 makes it possible to control or drive the adjustable elements 20. The general controller 41 can thus simultaneously control or drive the adjustable elements 20 and adjustable receivers 30 of the system 10.

Furthermore, each adjustable element 20 comprises a receiving device for receiving the general control wave OCg, which decodes an adjustment parameter contained in this general control wave OCg and originating from the general controller 41. The adjustable element 20 then uses the adjustment parameter to control and modify its impedance.

The general control wave OCg may be within a frequency band that is identical or different from the primary wave OP. Advantageously, these waves are at a different frequency, and the transmissions are independent.

In addition, as the adjustable elements 20 are fixed to the container C in a plurality of different positions, it is possible to modify even further the distribution of the primary wave OP within the volume V. The positions of the adjustable elements 20 on the container C may be optimized so as to best cover the volume V with a minimum number of adjustable elements 20. This spatial optimization may be carried out by simulation and/or measurement of the volume V. A margin may be added to the number of adjustable elements 20 used, in order to increase the identification robustness of the system 10.

Adjustable Elements—Optimization

The adjustable element(s) 20 may be taken into account in the adjustment and/or optimization processes described above for the adjustable receivers 30. As the adjustable element(s) 20 are identified at all times, they may then also be part of the dynamic list L.

Adjustable Elements—Energy Recovery

In addition, one, several, or all of the adjustable elements 20 (if they are part of the system 10) may comprise an energy recovery device similar to the one described above for the adjustable receivers 30. The adjustable element 20 can thus be energy self-sufficient and also self-sufficient in adapting its impedance. In this case, each adjustable element 20 will not need a wired connection with a general control module, and it will not need a wired connection with the general controller 41 of this detection system 10.

Adjustable Element—Spatial Distribution

The adjustable elements 20, when they are present in the system 10, can be located within the volume V without any wiring constraints (for example inside or outside the container C or on any surface of the container C). This gives great freedom in placing the adjustable elements 20 so as to best maximize the possibilities for detection and identification of all adjustable receivers 30 within the volume V. This also makes it possible to equip a container C very quickly, since it is sufficient to fix the adjustable elements 20 on the container C and to position the general antenna 42 close to the volume V.

The adjustable elements 20 may be attached to the container C by any attachment means. For example, the adjustable elements 20 are fixed to the container C by an adhesive or by an elastic fastening clip or by a screw or by a rivet or by interlocking or by force-fitting.

Furthermore, the adjustable elements 20 advantageously have a flat shape. A portion of their electrical circuit is for example directly printed on a substrate. The substrate is for example made of paper or cardboard or plastic or fabric, and for example has one side comprising an adhesive. Optionally, the portion of electrical circuit comprises an antenna. The adjustable elements 20 may also have a flexibility which allows them to bend along a radius of curvature which enables them to be fixed on non-planar surfaces. By means of these arrangements, the adjustable elements 20 can easily be fixed on a large number of surfaces (planar or non-planar) of a container, which allows positioning them at locations suitable for controlling the electromagnetic field inside the volume V.

Non-Adjustable Element

The system 10 according to the invention may further comprise non-adjustable elements 29 fixed within the volume V, having a predetermined and fixed impedance, this impedance being adapted to modify the manner in which the primary wave OP is reflected and/or absorbed by said non-adjustable element 29.

This or these non-adjustable elements 29 are fixed to the container C at different positions. These non-adjustable elements 29 allow modifying in a non-controllable manner the distribution of the primary wave OP within the volume V.

For example, these non-adjustable elements 29 are elements resonant in the frequency band of the primary wave OP.

For example, a non-adjustable element 29 can reflect the primary wave OP and/or absorb the primary wave OP. This non-adjustable element can make it possible to confine the primary wave OP to the volume V of the container C in order to optimize the efficiency of the adjustable elements 20 and adjustable receivers 30 within the volume V.

The positions of the non-adjustable elements 29 on the container C may be optimized so that the primary wave best covers the volume V with a minimum number of adjustable elements 20. This optimization may be carried out by simulation and/or by measurement (experimental method) of the volume V.

INDUSTRIAL APPLICATION

The system 10 incorporating adjustable receivers which participate in the detection of other receivers by their participation, in increasing numbers, in the modification and/or optimization of the electromagnetic field as they are identified by the general controller 41, allows the general controller 41 to more quickly determine other receivers present in the volume V but not yet identified.

This system 10 has numerous industrial applications.

For example in:

- a piece of furniture (optionally equipped with adjustable elements 20), such as storage furniture suitable for receiving products, such as a cupboard or a shelving unit, each product having an adjustable receiver attached to it, or such as office furniture such as a desk or a table; or
- a container of a store's cash register (optionally equipped with adjustable elements 20), into which products are inserted, each product having an associated adjustable receiver 30. The system will be able to identify the products by the adjustable receivers attached to the products, and the cash register will be able to issue a receipt; or
- a shopping cart of a store (optionally equipped with adjustable elements 20) and containing inside it several items for purchase, each item having an associated adjustable receiver 30; or
- a bag (optionally equipped with adjustable elements 20), for example a shopping bag, and containing inside it several items each having an adjustable receiver 30; or
- a motor vehicle or an airplane or a train (optionally equipped with adjustable elements 20 and/or adjustable receivers 30) and carrying devices inside it each having an adjustable receiver 30; or
- a room or other premises (optionally equipped with adjustable elements 20), for example an industrial space such as a warehouse, or a room in a residence, or a retail space in a shopping center, having movable elements each with an associated adjustable receiver 30; or
- store shelving, where each product is equipped with an adjustable receiver 30; or
- a storage or transit center for products, which may be sold by mail order, and where each product is equipped with an adjustable receiver 30.

The invention claimed is:

1. Receiver detection system comprising:
   an adjustable receiver,
   a general antenna suitable for emitting a primary wave, and for receiving a secondary wave emitted by the adjustable receiver in response to reception of the primary wave,
   a general controller connected to the general antenna, the general controller being suitable for commanding the emission of the primary wave and for detecting the adjustable receiver by means of the secondary wave received by the general antenna,
   wherein the adjustable receiver further comprises:
      a receiver antenna suitable for emitting the secondary wave;
      a receiver controller connected to the receiver antenna, the receiver controller being suitable for commanding the emission of the secondary wave by the receiver antenna and for detecting the primary wave received by the receiver antenna, the adjustable receiver having a modifiable impedance in order to modify the manner in which the primary wave is reflected and/or transmitted by the receiver antenna as a secondary wave, the system being configured such that, when the adjustable receiver is detected by the general controller, the general controller commands the receiver controller to switch from a detection mode to an interaction mode, in detection mode, the adjustable receiver has a base impedance, in interaction mode, the impedance of the adjustable receiver is alternated between a first configuration impedance and a second configuration impedance in order to detect other receivers, the interaction mode being of a duration that is an order of magnitude higher than the duration of each alternation of the first and second configuration impedances.

2. The system according to claim 1, wherein the first configuration impedance is the base impedance.

3. The system according to claim 1, wherein the first configuration impedance is at a distance from the second configuration impedance.

4. The system according to claim 1, wherein the alternations of the configuration impedances in interaction mode are determined by an optimization algorithm or by a predefined series of impedance values.

5. The system according to claim 1, wherein the alternations of the configuration impedances in interaction mode are carried out at irregular non-periodic time instants.

6. The system according to claim 1, wherein the general controller is suitable for commanding the alternations of the configuration impedances in interaction mode of the adjustable receiver.

7. The system according to claim 1, wherein the general controller is suitable for commanding the switch to interaction mode of the identified adjustable receivers, and the controller of the identified adjustable receiver is suitable for commanding the alternations of the configuration impedance when the controller of the identified adjustable receiver is in interaction mode.

8. Adjustable receiver comprising:

an antenna suitable for emitting a secondary wave in response to receiving a primary wave and for receiving a general control wave; and a controller connected to the antenna, the controller being suitable for commanding the emission of the secondary wave and for detecting the primary wave received and the general control wave, the adjustable receiver having a modifiable impedance thus influencing the secondary wave emitted, the adjustable receiver having a detection mode and an interaction mode, the adjustable receiver switching from detection mode to interaction mode according to the general control wave received, in detection mode, the adjustable receiver has a base impedance, and in interaction mode, the impedance of the adjustable receiver is adapted to alternate between a first configuration impedance and a second configuration impedance in order to detect other receivers, the interaction mode being of a duration that is an order of magnitude higher than the duration of each alternation of the first and second configuration impedances.

9. Method for detecting receivers, by a detection system comprising an adjustable receiver and a general antenna, wherein the general antenna is connected to a general controller, the method comprising:

emitting, by the general antenna and on command by the general controller, a primary wave;

receiving, by a receiver antenna of the adjustable receiver, the primary wave;

detecting, by a receiver controller connected to the receiver antenna, the primary wave received by the receiver antenna;

emitting, by the receiver antenna and on command by the receiver controller, a secondary wave, wherein the secondary wave is generated by reflecting and/or transmitting the primary wave detected by the receiver controller by a modifiable impedance of the adjustable receiver;

receiving, by the general antenna, the secondary wave;

detecting, by the general controller, the adjustable receiver based on the received secondary wave; and reconfiguring, by the receiver controller and on command by the general controller, the detected adjustable receiver by switching from a detection mode to an interaction mode, wherein:

in detection mode, the detected adjustable receiver has a base impedance, in interaction mode, reconfiguring the detected adjustable receiver comprises alternating the modifiable impedance between a first configuration impedance and a second configuration impedance in order to detect other receivers, and a duration of the interaction mode is an order of magnitude higher than the duration of each alternation of the first and second configuration impedances.

10. The method of claim 9, further comprising imposing, by the receiver controller, the base impedance independently of the general controller.

11. The method of claim 9, wherein the first configuration impedance is the base impedance.

12. The method of claim 9, wherein the first configuration impedance is at a distance from the second configuration impedance.

13. The method of claim 9, wherein the first configuration impedance and the second configuration impedance are close to and with one on either side of the base impedance within the complex plane.

14. The method of claim 9, further comprising determining the alternations of the configuration impedances in interaction mode by an optimization algorithm or by a predefined series of impedance values.

15. The method of claim 9, wherein alternating the modifiable impedance is carried out at irregular, non-periodic time instants.

16. The method of claim 9, wherein alternating the modifiable impedance is commanded by the general controller.

17. The method of claim 9, wherein switching from a detection mode to an interaction mode is commanded by the general controller, and alternating the modifiable impedance is commanded by the receiver controller.

18. The method of claim 9, wherein the detection system further comprises a second adjustable receiver, the method further comprising:

receiving, by a second receiver antenna of the second adjustable receiver, the primary wave;

detecting, by a second receiver controller connected to the second receiver antenna, the primary wave received by the second receiver antenna;

emitting, by the second receiver antenna and on command by the second receiver controller, a second secondary wave, wherein the second secondary wave is generated by reflecting and/or transmitting the primary wave detected by the second receiver controller by a modifiable impedance of the second adjustable receiver;

receiving, by the general antenna, the second secondary wave;

detecting, by the general controller, the second adjustable receiver based on the received second secondary wave; and reconfiguring, by the second receiver controller and on command by the general controller, the detected second adjustable receiver by switching from a detection mode to an interaction mode, wherein:

in detection mode, the detected second adjustable receiver has a base impedance, in interaction mode, reconfiguring the detected second adjustable receiver comprises alternating the modifiable impedance of the detected second adjustable receiver between a first configuration impedance of the detected second adjustable receiver and a second configuration impedance of the detected second adjustable receiver in order to detect other receivers, and a duration of the interaction mode of the detected second adjustable receiver is an order of magnitude higher than the duration of each alternation of the first and second configuration impedances of the detected second adjustable receiver.

19. The method of claim 9, wherein reconfiguring the detected adjustable receiver comprises alternating the modifiable impedance between three or more configuration impedances.

20. The method of claim 9, wherein the adjustable receiver comprises a plurality of adjustable components and associated antennas, the method further comprising:

emitting, by the general antenna and on command by the general controller, a general control wave containing identification information along with an associated adjustment parameter to designate each adjustable component for which said adjustment parameter is intended, and controlling, by said adjustable component, the impedance of the associated antenna in relation to the adjustment parameter if the identification information is equal to its adjustable component identifier.

21. The method of claim 9, wherein the detection system further comprises an adjustable element connected to the general antenna, and detecting the adjustable receiver comprises modifying an impedance of the adjustable element.

22. The method of claim 21, wherein modifying the impedance of the adjustable element and alternating the modifiable impedance of the adjustable receiver are performed simultaneously by the general controller, according to values determined by an optimization algorithm.

\* \* \* \* \*